March 7, 1939.  R. ANNEN  2,149,492
BALL BEARING FOR ROTOR SHAFTS
Filed Aug. 30, 1937
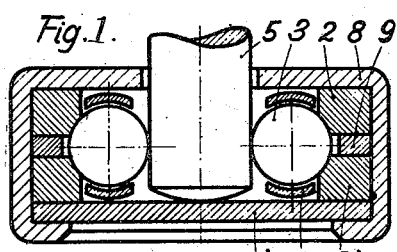
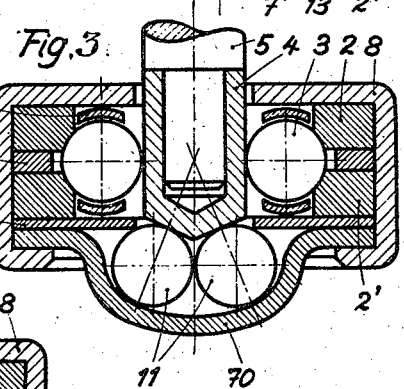
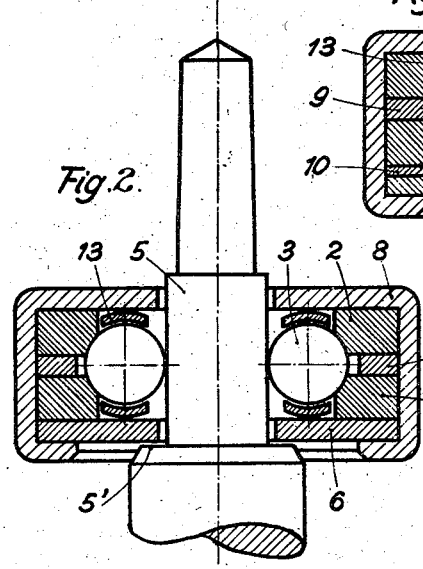

Patented Mar. 7, 1939

2,149,492

UNITED STATES PATENT OFFICE 2,149,492

BALL BEARING FOR ROTOR SHAFTS

Robert Annen, Bienne, Switzerland, assignor to the firm Roulements a Billes Miniatures S. A., Bienne, Switzerland, a joint-stock company of Switzerland Application August 30, 1937, Serial No. 161,664
In Switzerland September 4, 1936

4 Claims. (Cl. 308—188)

This invention relates to ball bearings for vertical shafts of the kind where the inner race is axially displaceable to a limited extent relatively to the outer race.

There are certain machines having a rotor subjected to changes of a magnetic flux which act in an axial direction. In such machines it is important that the rotor be capable of yielding to the effects of said flux and to "float" therein. Such rotors have been previously provided with bushed bearings because the known ball bearings could not be easily placed in electric counters, meters Ferrari, motors and the like on account of the thin walled housings.

To remedy this, the present invention consists in that the inner race is constituted by the shaft itself and that the outer race and a stationary abutment member for limiting the axial displacement of the shaft are fixed in position by being fitted into a jacket member the edges of which are turned over to retain said parts in position.

A certain clearance left between races and balls permits free sliding of the shaft in the bearing.

In order that the invention may be readily understood, several constructional embodiments thereof are illustrated in the accompanying drawing in which Figures 1 to 3 represent vertical sections through three different embodiments.

In the several figures of the drawing, similar signs of reference refer to similar parts.

Referring to Fig. 1, the inner race is constituted by the vertical axle or shaft 5. The balls 3 are disposed within a cage 13 and run on said inner race. The outer race comprises two rings 2, 2' having symmetrically arranged concave surfaces contacting the balls and which are fitted into a one-piece jacket member 8 together with a rigid abutment plate 7' and a spacing ring 9. The parts are retained in position by turning over the edges of the jacket member 8. The rigid abutment plate 7' limits the axial displacement of the inner race relatively to the outer race.

At the central portion of the abutment plate 7' upon which the axle or shaft 5 is adapted to bear a piece of a material different from that used for said plate 7' may be inserted to serve as a counterpivot block for the end of the axle or shaft 5.

In the bearing illustrated in Fig. 2, which is of similar construction to the bearing shown in Figure 1 and in which identical parts are designated by the same reference numerals, the rigid abutment plate 6 is formed with a central aperture through which the shaft or axle 5 passes. In this construction the axial displacement of the inner race is limited by a shoulder 5' formed on the shaft 5, the shoulder 5' being adapted to contact against a part of the abutment plate 6 which latter is polished for this purpose.

If the axial pressures are considerable, the bearing according to Fig. 3 may be used. The axial abutment of the shaft 5 comprises a rigid abutment plate 70 having a cup like central portion receiving the balls 11.

The washer 10 located between the ring 2' and the abutment plate 70 retains the balls 11 on their race when the shaft 5 is displaced upwardly.

A sleeve 4 hardened and polished and forced upon the shaft 5 forms the inner race.

What I claim as new is:

1. In a ball bearing arrangement for rotor shafts controlled by a magnetic flux causing small axial displacements, a vertical shaft constituting the inner race, a set of balls, a cage holding the balls in spaced relation, an outer race comprising two rings having symmetrically arranged concave surfaces contacting said balls, a spacing ring interposed between the said race rings, an abutment member limiting the axial movement of the shaft in one direction, and a one piece jacket member surrounding the race rings and having turned over edges to maintain race rings, spacing ring and abutment member pressed together to form a self contained unit.

2. Ball bearing according to claim 1, in which the abutment member is a solid plate for the end of the shaft.

3. Ball bearing according to claim 1, in which the abutment member is a plane provided with an aperture through which the shaft passes and is adapted to contact with a shoulder of said shaft.

4. Ball bearing according to claim 1, in which the abutment member is a plate formed to receive a ball bearing to constitute a thrust race for the end of the shaft.

ROBERT ANNEN.